United States Patent
Kim

(10) Patent No.: US 7,194,248 B2
(45) Date of Patent: Mar. 20, 2007

(54) APPARATUS AND METHOD FOR PERFORMING POWER SAVING CONTROL OF MOBILE TERMINAL

(75) Inventor: Jong-Seok Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 157 days.

(21) Appl. No.: 10/951,210

(22) Filed: Sep. 27, 2004

(65) Prior Publication Data

US 2005/0070339 A1    Mar. 31, 2005

(30) Foreign Application Priority Data

Sep. 30, 2003   (KR) .................... 10-2003-0068080

(51) Int. Cl.
*H04B 1/16* (2006.01)
(52) U.S. Cl. ................ 455/343.1; 455/343.5; 455/574
(58) Field of Classification Search ............ 455/343.1, 455/343.5, 343.6, 572, 574, 127.1, 127.5
See application file for complete search history.

(56) References Cited

U.S. PATENT DOCUMENTS 6,088,576 A * 7/2000 Sone ..................... 340/7.33
6,138,032 A * 10/2000 Hill et al. ................ 455/517
6,201,372 B1 * 3/2001 Green et al. ............. 320/132
2002/0142792 A1 * 10/2002 Martinez ................. 455/550

* cited by examiner

*Primary Examiner*—CongVan Tran
(74) *Attorney, Agent, or Firm*—The Farrell Law Firm

(57) ABSTRACT

Disclosed is an apparatus and method for performing power saving control of a mobile terminal, which includes a battery capacity measurement unit, an input unit, a memory and a controller. Using the input unit, the user specifies a power saving mode type of the terminal and sets a power saving mode and power saving mode items corresponding to the specified power saving mode type. The memory stores information of the set power saving mode and the set power saving mode items in association with the specified power saving mode type. The controller performs power saving control corresponding to the set power saving mode items if battery capacity measured by the measurement unit is less than or equal to a preset battery capacity. The user can actively select how the terminal performs the power saving control, in their desired manners according to the remaining battery capacity.

18 Claims, 13 Drawing Sheets

(a)

(b)

(a) (b)

(a)

(b)

(c)

(d)

(a)

(b)

(c)

APPARATUS AND METHOD FOR PERFORMING POWER SAVING CONTROL OF MOBILE TERMINAL

PRIORITY

This application claims priority to an application entitled "APPARATUS AND METHOD FOR PERFORMING POWER SAVING CONTROL OF MOBILE TERMINAL", filed in the Korean Intellectual Property Office on Sep. 30, 2003 and assigned Serial No. 2003-68080, the contents of which are incorporated herein by reference.

BACKGROUND OF THE INVENTION

1. Field of the Invention

The present invention relates to a mobile terminal, and more particularly to an apparatus and method for performing a power saving control procedure of a mobile terminal to decrease power consumption of the mobile terminal.

2. Description of the Related Art

Generally, a mobile terminal receives power from a rechargeable battery. The latest batteries used as power sources for mobile terminals provide high capacity and excellent performance to provide a very long run time per charge. However, when traveling or moving to an area where no electricity is available, it is difficult to sufficiently use the mobile terminal only with the rechargeable battery in most cases. Various methods for saving battery power of a mobile terminal have been developed to overcome such a problem. For example, in the prior art, a mobile terminal enters a power saving mode when reaching a time preset by a user, or according to a period of time for which it stays in a standby mode.

Although the conventional methods for performing power saving control of a mobile terminal have been developed in various ways as described above, the available conventional power saving control methods for mobile terminals are limited and do not permit the user to actively select how to perform power saving control in their desired manners.

SUMMARY OF THE INVENTION

Therefore, the present invention has been made in view of at least the above problem, and it is an object of the present invention to provide an apparatus and method for performing power saving control of a mobile terminal, wherein a user sets a desired power saving mode condition and desired power saving mode items of a mobile terminal, and the mobile terminal performs power saving control corresponding to the set power saving mode items when the set power saving mode condition is satisfied.

It is another object of the present invention to provide an apparatus and method for performing power saving control of a mobile terminal, wherein a remaining battery capacity of a mobile terminal is detected, and power saving control is automatically performed when the detected remaining battery capacity is less than or equal to a preset remaining battery capacity.

In accordance with one aspect of the present invention, the above and other objects can be accomplished by an apparatus for performing a power saving control of a mobile terminal, the apparatus comprising a battery capacity measurement unit for measuring battery capacity of the mobile terminal; an input unit for specifying a power saving mode type of the mobile terminal, and setting a power saving mode and power saving mode items corresponding to the specified power saving mode type; a memory for storing information related to the set power saving mode and the set power saving mode items in association with the specified power saving mode type; and a controller for performing the power saving control corresponding to the set power saving mode items if the battery capacity measured by the battery capacity measurement unit is less than or equal to a preset remaining battery capacity.

In accordance with another aspect of the present invention, there is provided a method for performing a power saving control of a mobile terminal, the method comprising the steps of specifying a power saving mode type upon request of a user to specify the power saving mode type; setting a power saving mode condition corresponding to the specified power saving mode type; setting power saving mode items corresponding to the specified power saving mode type; and performing the power saving control corresponding to the set power saving mode items if the set power saving mode condition is satisfied.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
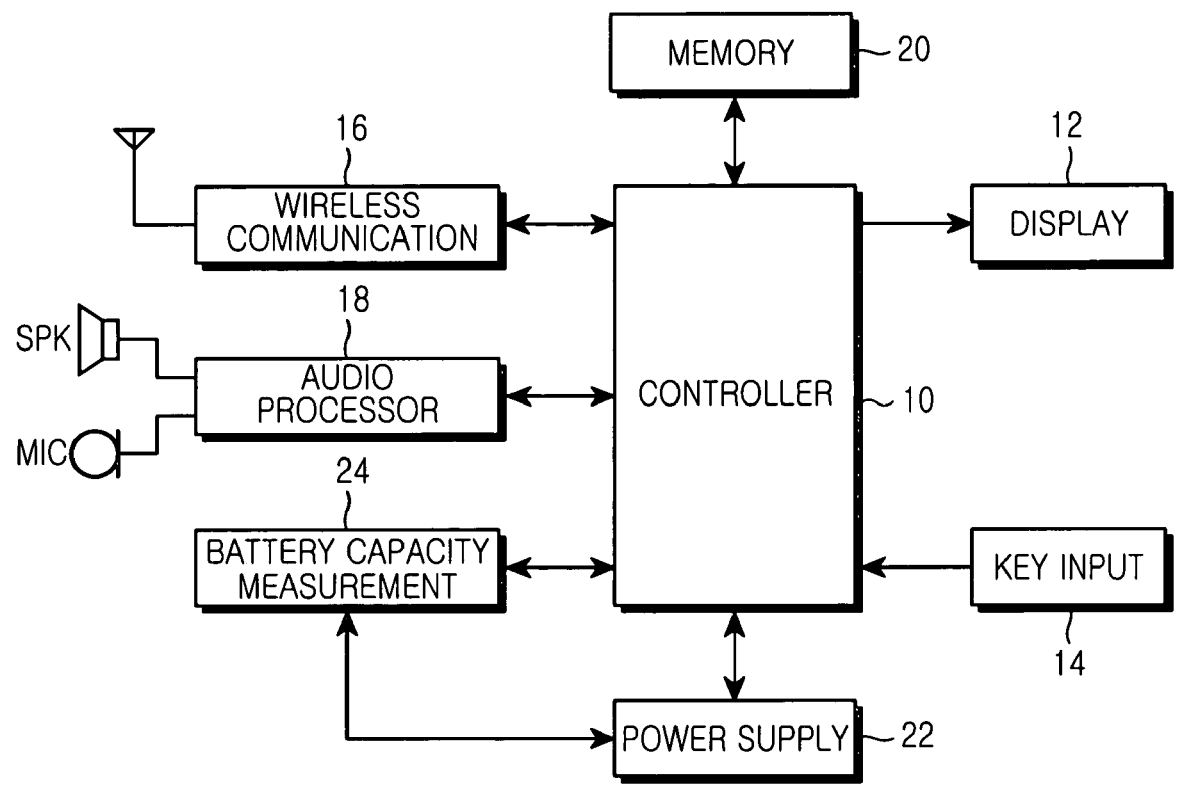
FIG. 1 is a block diagram showing the configuration of a mobile terminal according to an embodiment of the present invention.

Now, preferred embodiments of the present invention will be described in detail with reference to the annexed drawings. In the drawings, the same or similar elements are denoted by the same reference numerals even though they are depicted in different drawings. In the following description made in conjunction with preferred embodiments of the present invention, a variety of specific elements are shown. The description of such elements has been made only for a better understanding of the present invention. Those skilled in the art will appreciate that the present invention can be implemented without using the above-mentioned specific elements. In the following description of the present invention, a detailed description of known functions and configurations incorporated herein will be omitted when it may obscure the subject matter of the present invention.

FIG. 1 is a block diagram showing the configuration of a mobile terminal according to an embodiment of the present invention.

As shown in FIG. 1, the mobile terminal according to the embodiment of the present invention includes a controller 10, a display unit 12, a key input unit 14, a wireless communication module 16, an audio processor 18, a memory 20, a power supply unit 22, and a battery capacity measurement unit 24.

The controller 10 controls the overall operation of the mobile terminal. According to the embodiment of the present invention, the controller 10 also performs the control required to set a power saving mode in the mobile terminal, and performs power saving control during the power saving mode. Via an interface with a user of the terminal, the controller 10 controls operations of the terminal required to specify a power saving mode type, set a power saving mode ON condition and set power saving mode items. The controller 10 performs power saving control corresponding to the preset power saving mode items if the preset power saving mode ON condition is satisfied.

The display unit 12 may be composed of a display device such as an LCD (Liquid Crystal Display). The display unit 12 displays information menus used for setting a power saving mode of the mobile terminal under the control of the controller 10. For example, the display unit 12 displays a menu for specifying a power saving mode type, a menu for setting a power saving mode ON condition, and a menu for setting power saving mode items.

As an input unit for interfacing with the user, the key input unit 14 includes various function keys and a plurality of keys for phone communication, text input, or the like. The key input unit 14 outputs key input data corresponding to a key pressed by the user to the controller 10. The user can use the keys of the input unit 14 to set the power saving mode of the mobile terminal.

Under the control of the controller 10, the wireless communication module 16 controls transmission and reception of audio and control data. Under the control of the controller 10, the audio processor 18 converts audio data received from the wireless communication module 16 to an audible sound and outputs it via a speaker SPK. The audio processor 18 also produces data corresponding to an audio signal received from a microphone MIC, and then outputs the data to the wireless communication module 16. When the wireless communication module 16 receives an incoming call, the audio processor 18 generates a ring tone through the speaker SPK under the control of the controller 10.

The memory 20 may be composed of a ROM (Read Only Memory), a RAM (Random Access Memory), or the like, for storing data and programs required to perform the power saving control of the mobile terminal. According to the embodiment of the present invention, the memory 20 stores information of a power saving mode ON condition and power saving mode items set by the user in association with a power saving mode type specified by the user.

The power supply unit 22 supplies power from a battery (not shown) to each component of the mobile terminal.

The battery capacity measurement unit 24 measures the battery capacity of the battery coupled to the terminal via the power supply unit 22, and transfers the measured battery capacity to the controller 10. Based on the measured battery capacity, the controller 10 calculates the remaining battery capacity of the battery.

According to the embodiment of the present invention, the mobile terminal described above sets a power saving mode via an interface with the user, and performs power saving control according to the set power saving mode.

Figure 2:
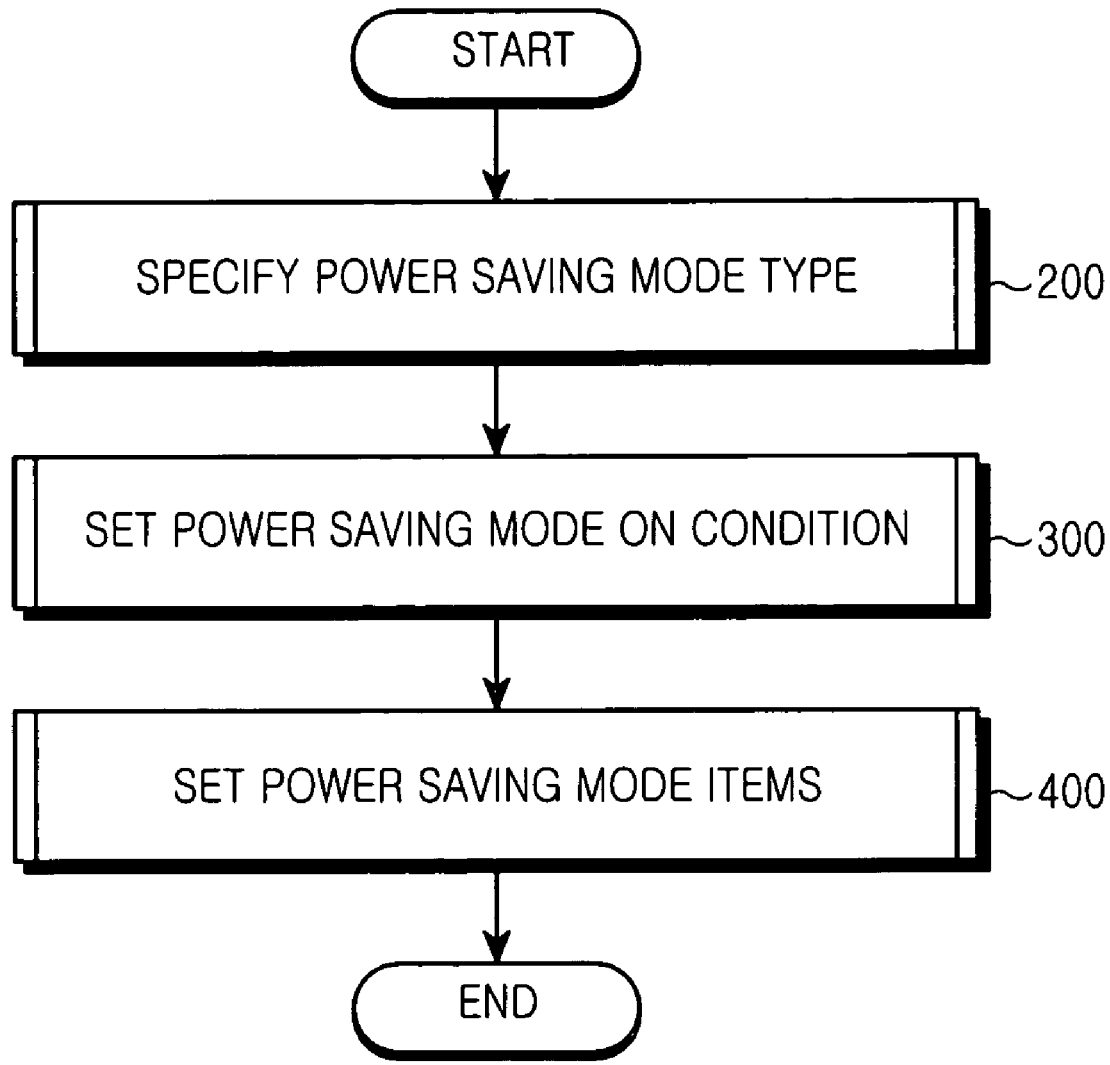
FIG. 2 is a flow chart showing a method for setting a power saving mode in the mobile terminal according to the embodiment of the present invention.
Figure 3A:
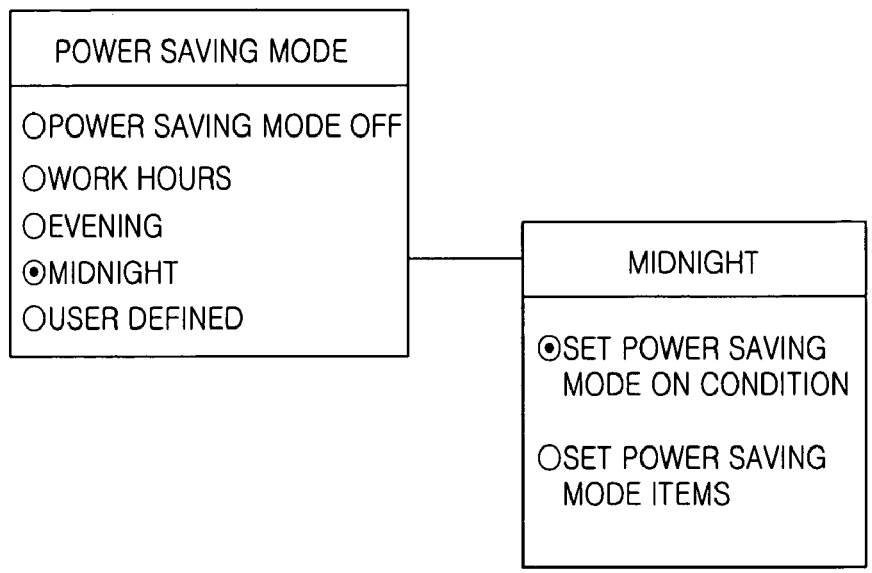
FIGS. 3A, 3B and 3C are diagrams illustrating the method for setting the power saving mode in the mobile terminal according to the embodiment of the present invention.
Figure 3B:
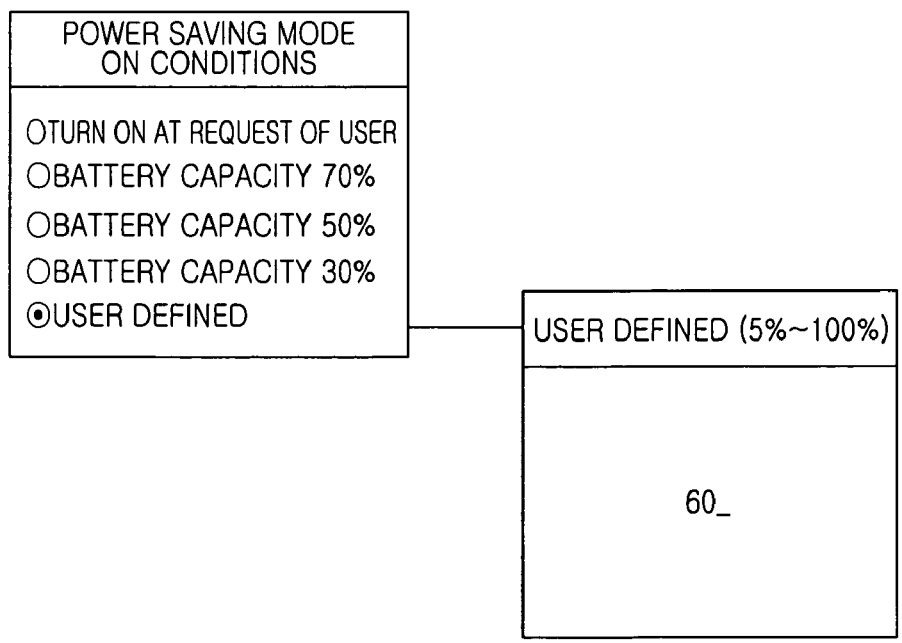
Figure 3C:
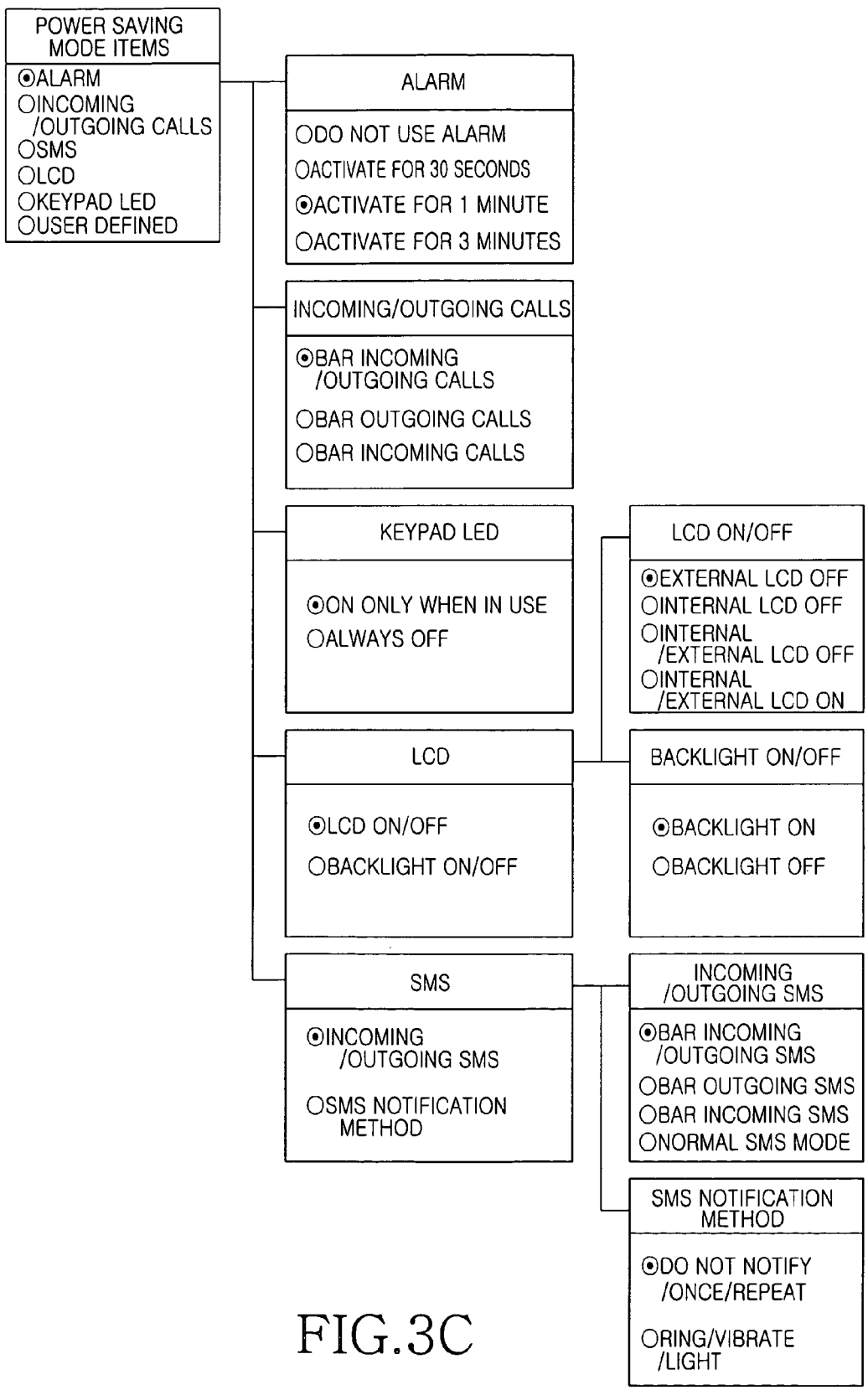

FIG. 2 is a flow chart showing a method for setting a power saving mode of a mobile terminal according to the embodiment of the present invention, and FIGS. 3A, 3B and 3C are diagram showing power saving mode setting menus in a tree structure according to the embodiment of the present invention. FIG. 3A is a diagram showing a menu for specifying a power saving mode type in the power saving mode setting procedure according to the embodiment of the present invention. FIG. 3B is a diagram showing a menu for setting a power saving mode ON condition corresponding to the power saving mode type specified according to the embodiment of the present invention. FIG. 3C is a diagram showing a menu for setting power saving mode items corresponding to the power saving mode type specified according to the embodiment of the present invention.

The method for setting the power saving mode in the mobile terminal according to the embodiment of the present invention will now be described with reference to FIGS. 1, 2, 3A, 3B and 3C.

The controller 10 specifies a power saving mode type at step 200 in FIG. 2. As shown in FIG. 3A, the menu for specifying the power saving mode type may provide power saving mode types such as "power saving mode off", "work hours", "evening", "midnight" and "user defined". If the user selects, for example, a power saving mode type "midnight" from the power saving mode types, the controller 10 specifies the power saving mode type as the selected type "midnight", and displays a menu for setting a power saving mode ON condition and power saving mode items corresponding to the specified power saving mode type "midnight".

When the controller 10 receives a request to set the power saving mode ON condition from the user after displaying the menu for setting the power saving mode ON condition and the power saving mode items, the controller 10 sets, at step 300, a power saving mode ON condition corresponding to the power saving mode type specified at step 200. As shown in FIG. 3B, the menu for setting the power saving mode ON condition may provides several options such as "turn on at request of user", "battery capacity 70%", "battery capacity 50%", "battery capacity 30%", and "user defined". The first option "turn on at request of user" allows the mobile terminal to enter the power saving mode at the request of the user, and the second option "battery capacity 70%" is to allow the mobile terminal to enter the power saving mode when the remaining battery capacity is 70% or less. The last option "user defined" is to allow the user to specify a remaining battery capacity at which the mobile terminal enters the power saving mode. The controller 10 sets the power saving mode ON condition as selected by the user from the options. For example, if the user selects the last option "user defined" and then inputs "60%" as an input value of a desired ON condition, the controller 10 sets the power saving mode ON condition such that it enters the power saving mode when the remaining battery capacity is 60% or less.

On the other hand, when the controller 10 receives a request to set power saving mode items from the user after displaying the menu for setting the power saving mode ON condition and the power saving mode items corresponding to the specified power saving mode, the controller 10 sets the power saving mode items at step 400. As shown in FIG. 3C, the power saving mode items may include "alarm", "incoming/outgoing calls", "SMS", "keypad LED" and "user defined" items. If the user selects each of the power saving mode items, and selects one of a plurality of item operating modes corresponding to the selected power saving mode item, the controller 10 sets each of the power saving mode items to operate in the selected item operating mode when the terminal is in the power saving mode.

Figure 4:
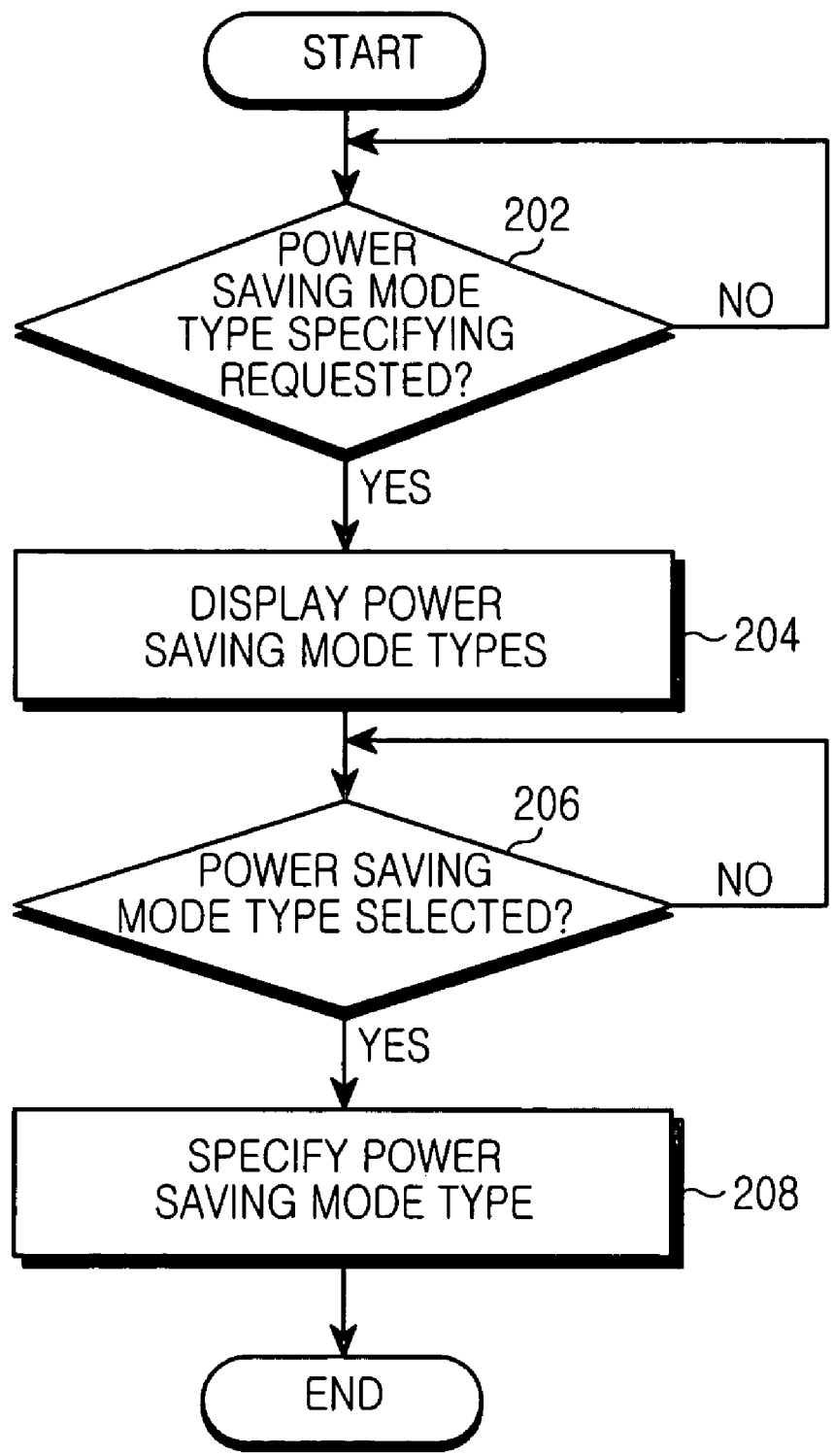
FIG. 4 is a flow chart showing a method for specifying a power saving mode type in the power saving mode setting procedure of FIG. 2.
Figure 5:
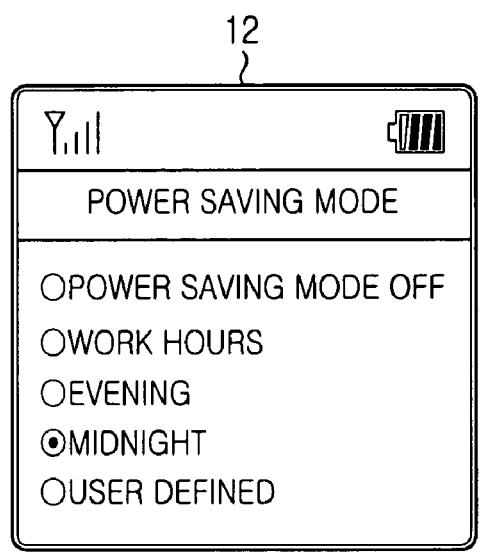
FIG. 5 shows exemplary screenshots of a display unit of the mobile terminal when specifying the power consumption mode type according to the embodiment of the present invention.
Figure 5:
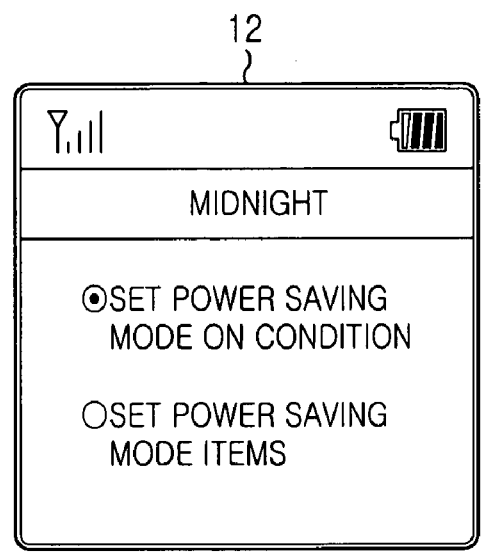

FIG. 4 is a flow chart showing a method for specifying the power saving mode type in the power saving mode setting procedure of step 200 of FIG. 2, and FIG. 5 shows screenshots of the display unit 12 when specifying the power consumption mode type according to the embodiment of the present invention. The method for specifying the power saving mode type corresponding to step 200 of FIG. 2 will now be described in more detail with reference to FIGS. 1 to 5.

At step 202, the controller 10 determines if the user has made a request to specify a power saving mode type. For example, if the user selects the power saving mode menu, the controller 10 detects this selection as a request to specify the power saving mode type, and then moves to step 204. At step 204, the controller 10 displays power saving mode types on the display unit 12. For example, the controller 10 may display the power saving mode types as shown in diagram (a) of FIG. 5. The menu for setting the power saving mode type may provide several power saving mode types such as "power saving mode off", "work hours", "evening" "midnight" and "user defined" as shown diagram (a) of in FIG. 5. After displaying the power saving mode types as described above, the controller 10 determines, at step 206, if the user has selected a power saving mode type. The user can select a desired one of the power saving mode types using the keys provided on the key input unit 14. If the user selected the desired power saving mode type, the controller 10 specifies, at step 208, the power saving mode type as selected by the user. For example, if the user selects a power saving mode type "midnight" from the power saving mode types such as "power saving mode off", "work hours", "evening", "midnight" and "user defined", the controller 10 specifies the power saving mode type as the selected type "midnight". Selection of a plurality of power saving mode types is also possible according to the embodiment of the present invention.

After specifying the power saving mode type as described above, the controller 10 displays a submenu screen for setting a power saving mode ON condition and power saving mode items corresponding to the specified power saving mode type "midnight" as shown in diagram (b) of FIG. 5. The submenu screen as shown in diagram (b) of FIG. 5 provides the following two options. The first option "power saving mode ON condition setting" is used to set a power saving mode ON condition corresponding to the specified power saving mode type, and the second option "power saving mode items setting" is used to set power saving mode items corresponding to the specified power saving mode type.

Figure 7:
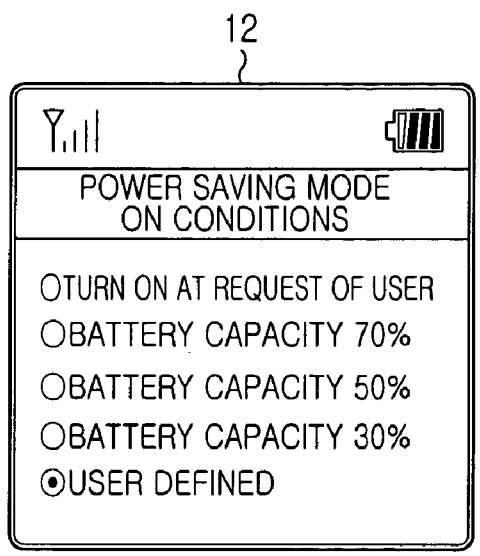
FIG. 7 shows exemplary screenshots of the display unit when setting the power saving mode condition according to the embodiment of the present invention.
Figure 7:
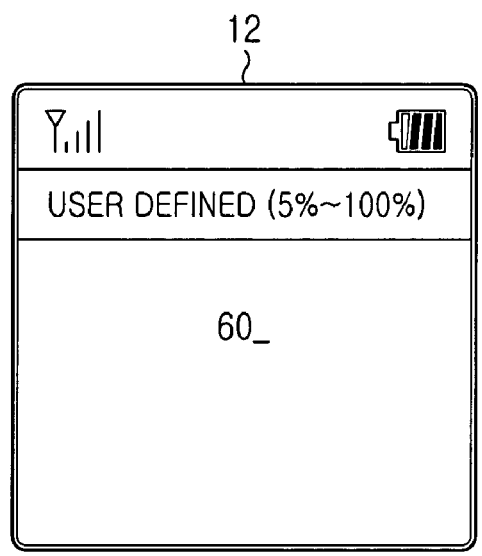

When the user selects the first option "power saving mode ON condition setting" in the submenu screen as shown in diagram (b) of FIG. 5, the controller 10 displays a screen, as shown in diagram (a) of FIG. 7, for setting a power saving mode ON condition corresponding to the specified power saving mode type.

Figure 6:
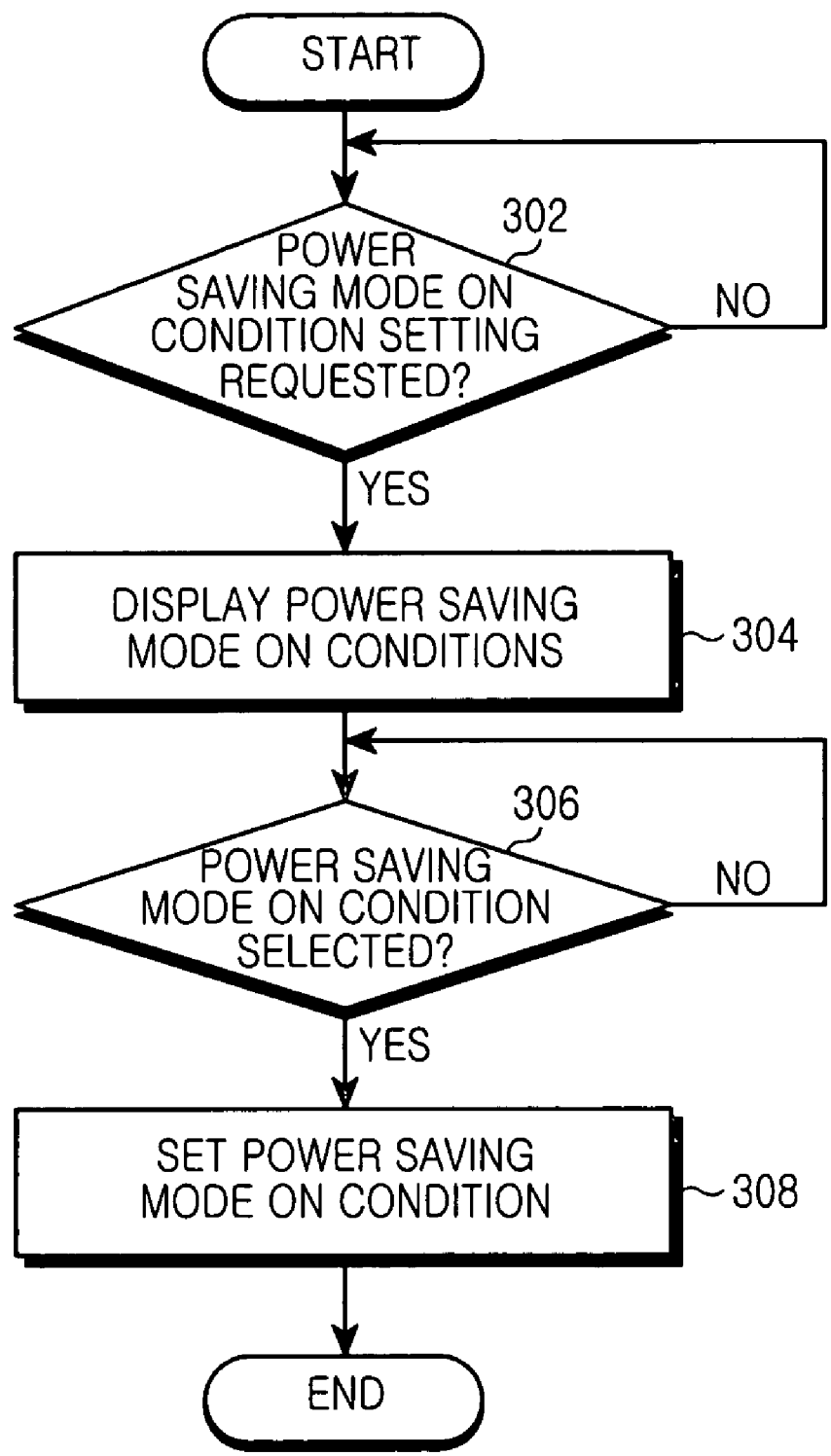
FIG. 6 is a flow chart showing a method for setting a power saving mode condition in the power saving mode setting procedure of FIG. 2.

FIG. 6 is a flow chart showing a method for setting a power saving mode ON condition in the power saving mode setting procedure of step 300 of FIG. 2, and FIG. 7 shows exemplary screenshots of the display unit 12 when setting the power saving mode ON condition according to the embodiment of the present invention.

The method for setting the power saving mode ON condition corresponding to step 300 of FIG. 2 will now be described in more detail with reference to FIGS. 1 to 7.

At step 302, the controller 10 determines if the user has made a request to set a power saving mode ON condition. For example, if the user selects the first option "power saving mode ON condition setting" in the screen for setting the power saving mode ON condition and the power saving mode items as shown in diagram (b) of FIG. 5, the controller 10 determines this selection as a request to set the power saving mode ON condition and then moves to step 304. At step 304, the controller 10 displays power saving mode ON conditions as options on the display unit 12. For example, the controller 10 may display power saving mode ON conditions as shown in diagram (a) of FIG. 7, which may include, for example, "turn on at request of user", "battery capacity 70%", "battery capacity 50%", "battery capacity 30%" and "user defined" as shown in diagram (a) of FIG. 7. The first option "turn on at request of user" allows the mobile terminal to enter the power saving mode when requested by the user. The second option "battery capacity 70%" allows the mobile terminal to enter the power saving mode when the remaining battery capacity is 70% or less. The last option "user defined" allows the user to set a desired remaining battery capacity at which the mobile terminal enters the power saving mode.

After displaying the power saving mode ON conditions as described above, the controller 10 determines, at step 306, if the user has selected one of the power saving mode ON conditions. With the keys provided on the key input unit 14, the user can select a desired one of the displayed power saving mode ON conditions. If the user has selected a power saving mode ON condition, the controller 10 sets, at step 308, the power saving mode ON condition as selected by the user. For example, if the third option "battery capacity 50%" is selected, the controller 10 sets the power saving mode ON condition so as to cause the mobile terminal to enter the power saving mode when the remaining battery capacity is 50% or less. If the last option "user defined" is selected, the controller 10 displays a user defined screen as shown in diagram (b) of FIG. 7 to receive an input of a power saving mode ON condition from the user. If the user inputs a desired power saving mode ON condition, the controller 10 sets the power saving mode ON condition as input by the user. For example, if the user inputs "60" via the user defined screen, the controller 10 sets the power saving mode ON condition such that the terminal enters the power saving mode when the remaining battery capacity is 60% or less.

Figure 9:
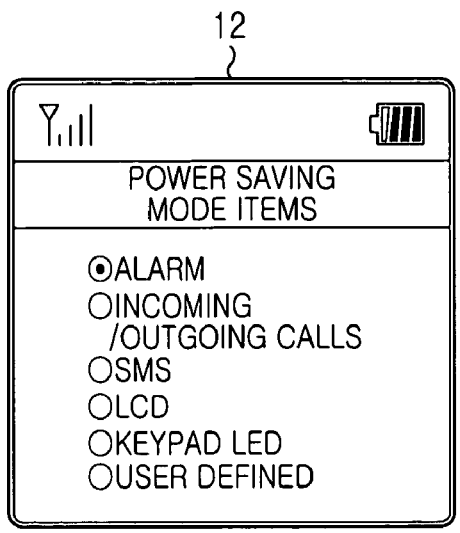
FIG. 9 shows exemplary screenshots of the display unit when setting the power saving mode items according to the embodiment of the present invention.
Figure 9:
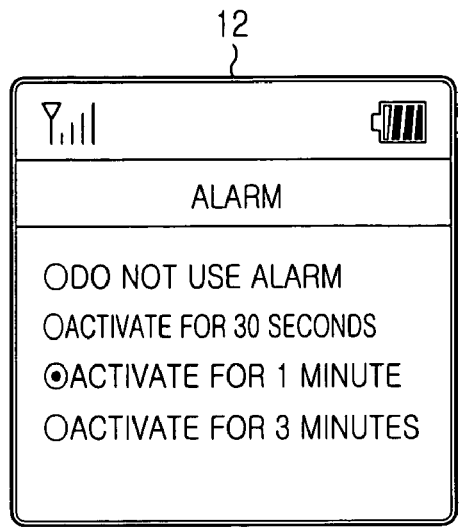
Figure 9:
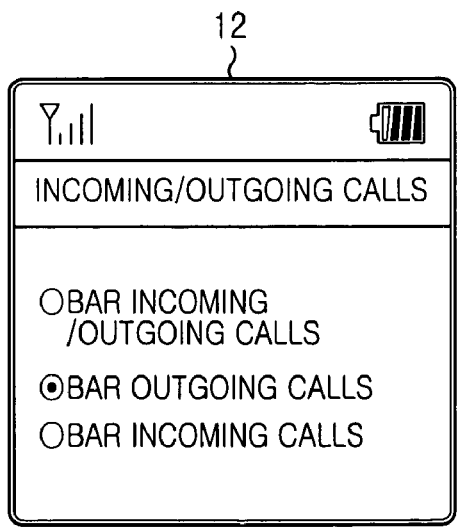
Figure 9:
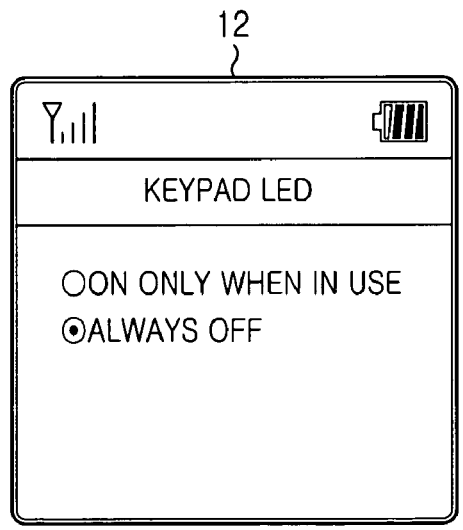
Figure 10:
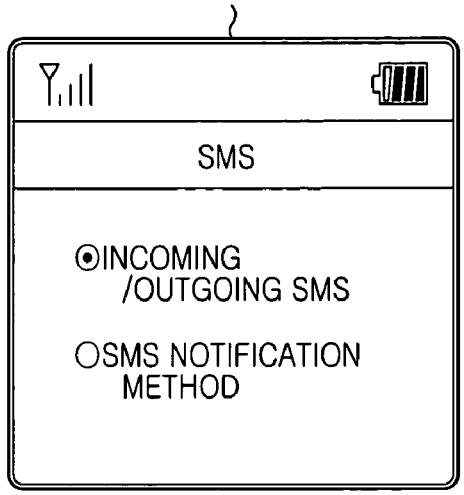
FIG. 10 shows exemplary screenshots of the display unit when setting the power saving mode items according to the embodiment of the present invention.
Figure 10:
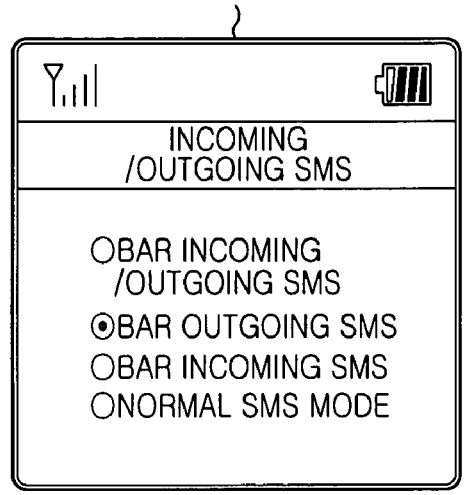
Figure 10:
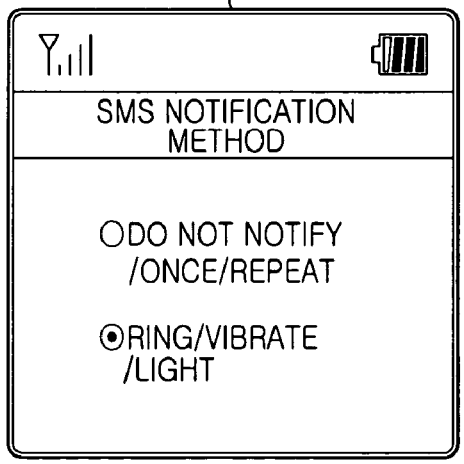

On the other hand, after specifying the power saving mode type, if the second option "power saving mode items setting" in the submenu as shown in diagram (b) of FIG. 5 is selected by the user, the controller 10 displays a screen, as shown in diagram (a) of FIG. 9, for setting power saving mode items corresponding to the specified power saving mode type.

Figure 8:
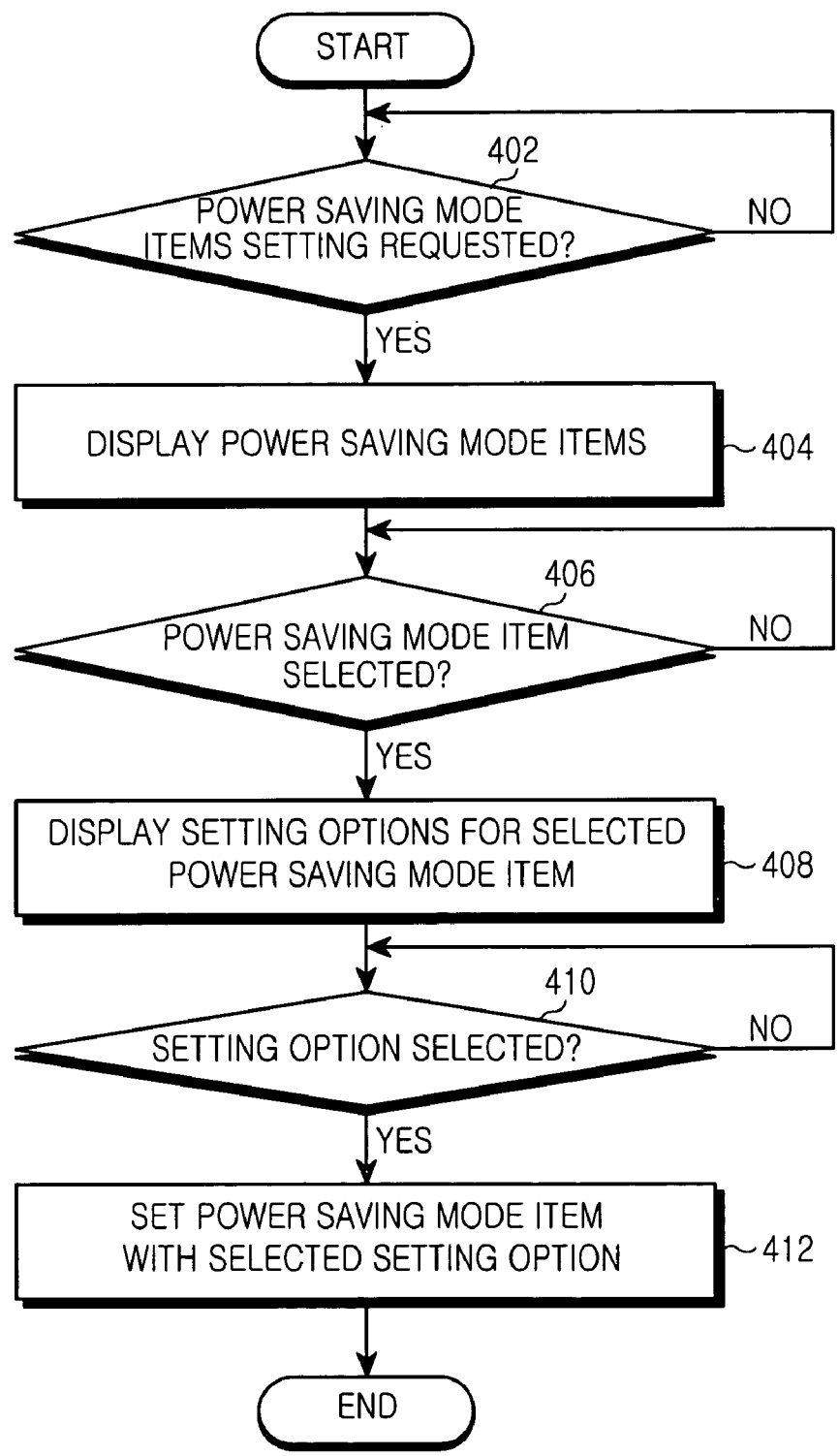
FIG. 8 is a flow chart showing a method for setting power saving mode items in the power saving mode setting procedure of FIG. 2.
Figure 11:
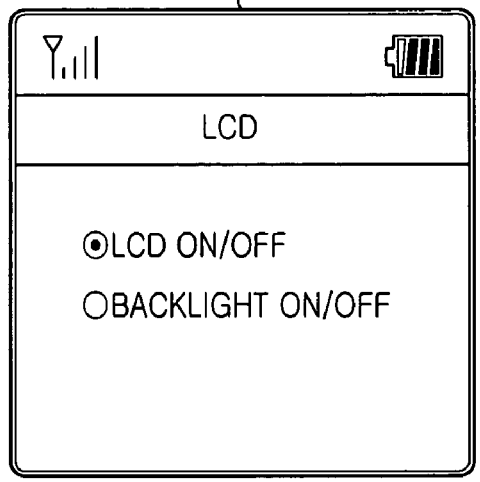
FIG. 11 shows exemplary screenshots of the display unit when setting the power saving mode items according to the embodiment of the present invention.
Figure 11:
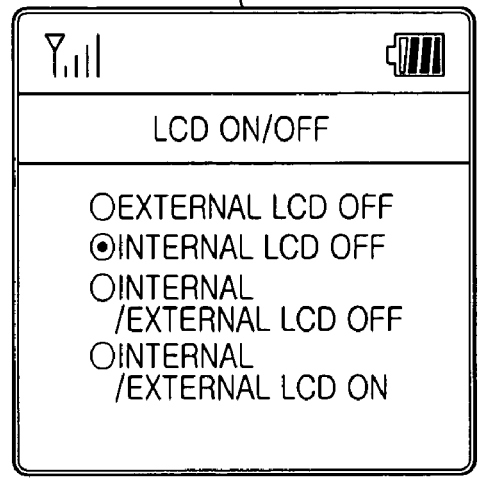
Figure 11:
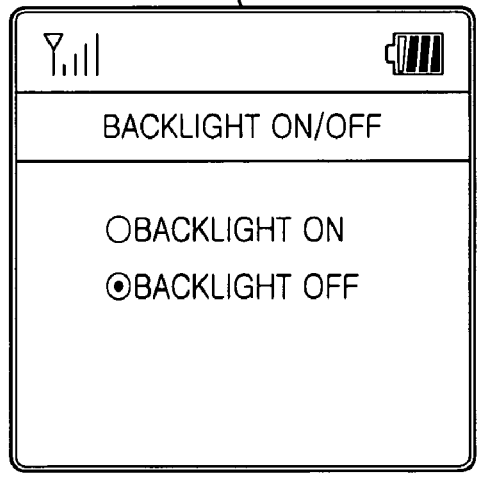

FIG. 8 is a flow chart showing a method for setting power saving mode items in the power saving mode setting procedure of step 400 of FIG. 2, to FIGS. 9 and 11 are exemplary screenshots of the display unit 12 when setting the power saving mode items according to the embodiment of the present invention.

The method for setting the power saving mode items corresponding to step 400 of FIG. 2 will now be described in more detail with reference to FIGS. 1 to 11.

At step 402, the controller 10 determines if the user has requested to set power saving mode items. For example, if the user selects the second option "power saving mode items setting" in the screen for setting the power saving mode ON condition and the power saving mode items as shown in diagram (b) of FIG. 5, the controller 10 determines this selection as a request to set the power saving mode items and then moves to step 404. At step 404, the controller 10 displays power saving mode items on the display unit 12. For example, the controller 10 may display power saving mode items as shown in diagram (a) of FIG. 9, which may include, for example, "alarm", "incoming/outgoing calls", "SMS", "LCD", "keypad LED" and "user defined" items. The "alarm" item is used to set the alarm to be activated or deactivated during the power saving mode and to set how long the alarm rings if it is activated. The "incoming/outgoing calls" item is used to restrict incoming and outgoing wireless signals during the power saving mode, that is, to bar all the incoming and outgoing wireless signals or only the outgoing wireless signals or only the incoming wireless signals during the power saving mode. The "SMS" item is used to restrict incoming and outgoing SMS messages and set an SMS notification method during the power saving mode, that is, to bar all the incoming and outgoing SMS messages or only the outgoing SMS messages or only the incoming SMS messages, and to set how to notify the user of receipt of an SMS message during the power saving mode. The "LCD" item is used to set an LCD or backlight to be turned on or off during the power saving mode. The "keypad LED" item is used to set an LED to be constantly off or turned on only when the key is pressed during the power saving mode.

After displaying the power saving mode items as described above, the controller 10 determines, at step 406, if the user selects a power saving mode item. With the keys provided on the key input unit 14, the user can select a desired one of the power saving mode items. If the user selects a desired power saving mode item, the controller 10 displays, at step 408, setting options corresponding to the selected power saving mode item on the display 12. For example, if the "alarm" power saving mode item is selected, the controller 10 displays setting options corresponding to the "alarm" item on the display 12 as shown in diagram (b) of FIG. 9. The setting options corresponding to the "alarm" item include setting options such as "do not user alarm", "activate for 30 seconds", "activate for 1 minute", "activate for 3 minutes" as shown in diagram (b) of FIG. 9. If the "incoming/outgoing calls" item is selected, the controller 10 displays setting options corresponding to the "incoming/outgoing calls" item on the display 12 as shown in diagram (c) of FIG. 9. The setting options corresponding to the "incoming/outgoing calls" item may include setting options such as "bar incoming and outgoing calls", "bar outgoing calls" and "bar incoming calls" as shown in diagram (c) of FIG. 9. If the "keypad LED" item is selected, the controller 10 displays setting options corresponding to the "keypad LED" item on the display 12 as shown in diagram (d) of FIG. 9. The setting options corresponding to the "keypad LED" item may include setting options such as "ON only when in use" and "always OFF" as shown in diagram (b) of FIG. 9. If the "SMS" item is selected, the controller 10 displays setting options corresponding to the "SMS" item on the display 12 as shown in diagram (a) of FIG. 10. The setting options corresponding to the "SMS" item may include setting options such as "incoming/outgoing SMS messages" and "SMS notification method" as shown in diagram (a) of FIG. 10. The first setting option "incoming/outgoing SMS messages" may include SMS barring setting options as shown in diagram (b) of FIG. 10 and the second setting option "SMS notification method" may include SMS notification setting options as shown in diagram (c) of FIG. 10. If the "LCD" item is selected, the controller 10 displays setting options corresponding to the "LCD" item on the display 12 as shown in diagram (a) of FIG. 11. The setting options corresponding to the "LCD" item may include setting options such as "LCD ON/OFF" and "backlight ON/OFF" as shown in diagram (a) of FIG. 11. The first setting option may include LCD setting options as shown in diagram (b) of FIG. 11, and the second setting option may include backlight setting options as shown in diagram (c) of FIG. 11.

After displaying the setting options corresponding to the selected power saving mode item as described above, the controller 10 determines, at step 410, if a setting option is selected from the displayed setting options. The user can select a desired one of the displayed setting options corresponding to the selected power saving mode item. For example, if the user has selected the "alarm" item as shown in diagram (b) of FIG. 9, the user can select one of the setting options, such as "do not use alarm", "activate for 30 seconds", "activate for 1 minute" and "activate for 3 minutes", corresponding to the "alarm" item. If the user selects a desired one of the setting options corresponding to the selected power saving mode item, the controller 10 sets, at step 412, the power saving mode item with the selected setting option.

If the power saving mode type is specified and then a power saving mode ON condition and power saving mode items corresponding to the specified power saving mode type are set as described above, the mobile terminal performs power saving control corresponding to the set power saving mode items when the set power saving mode ON condition is satisfied.

Figure 12:
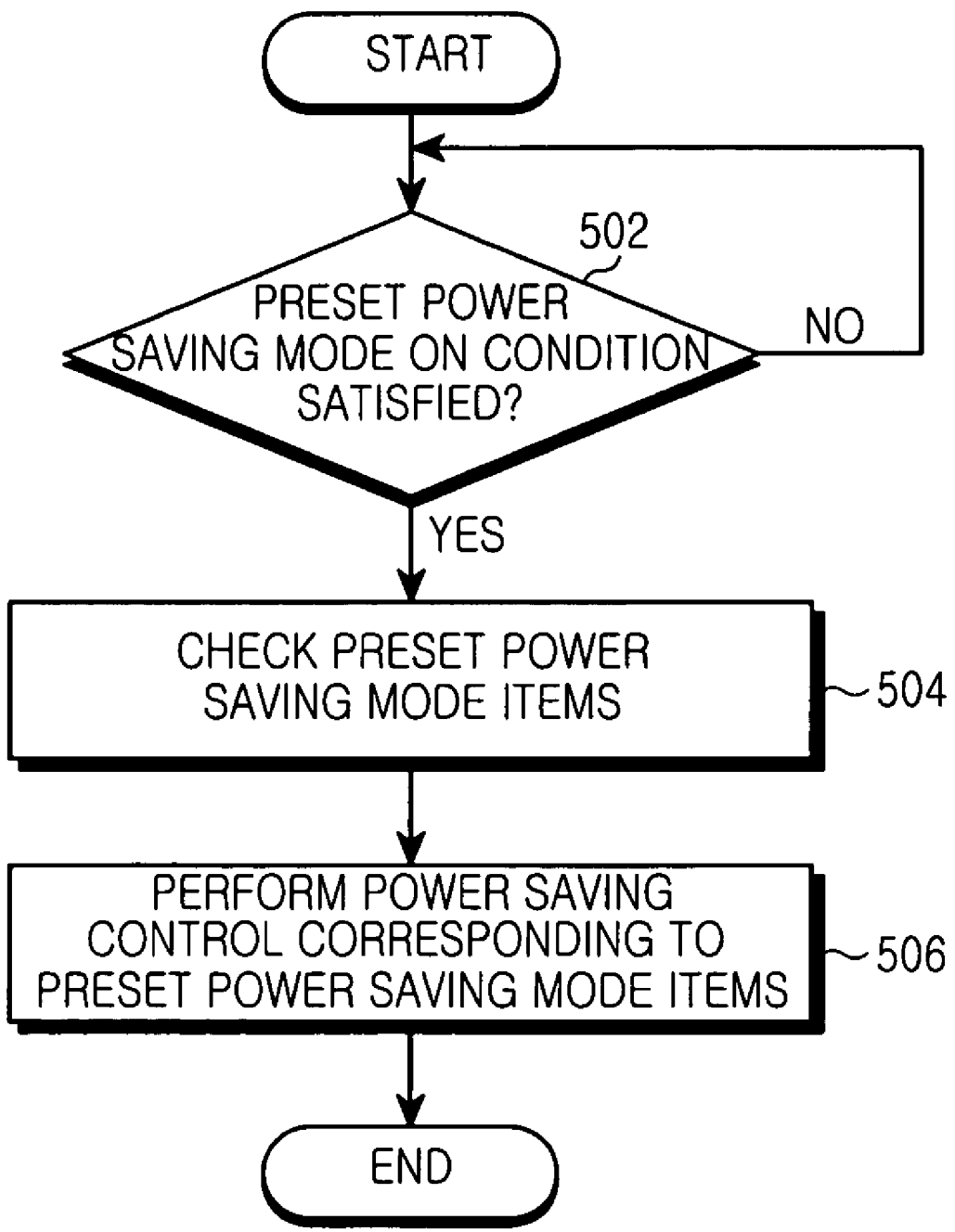
FIG. 12 is a flow chart showing a method for performing power saving control in the power saving mode according to the embodiment of the present invention.

FIG. 12 is a flow chart showing how power saving control is performed when the mobile terminal is in the power saving mode, according to the embodiment of the present invention. The method for performing the power saving control corresponding to the set power saving mode items when the mobile terminal enters the set power saving mode ON condition, according to the embodiment of the present invention, will now be described in detail with reference to FIG. 12.

The following description will be given under the assumption that the power saving mode ON condition is set as "battery capacity 70%". We also assume that the power saving mode items are set as follows. The "alarm" power saving mode item is set as "activate for 1 minute"; the "incoming/outgoing calls" item is set as "bar incoming calls"; the "keypad LED" item is set as "always OFF"; the "incoming/outgoing SMS messages" item is set as "bar incoming SMS messages"; the "SMS notification method" item is set as "vibrate"; the "LCD" item is set as "LCD OFF"; and the "backlight" item is set as "backlight OFF".

At step 502 of FIG. 12, the controller 10 determines if the set power saving mode ON condition is satisfied. That is, the controller 10 determines whether or not the battery capacity is 70% or less. The controller 10 performs this determination based on a battery capacity measured by the battery capacity measurement unit 24. If the battery capacity is 70% or less satisfying the set power saving mode ON condition, the controller 10 moves to step 504.

At step 504, the controller 10 checks the set power saving mode items. That is, the controller 10 confirms that the "alarm" power saving mode item was set as "activate for 1 minute"; the "incoming/outgoing calls" item was set as "bar incoming calls"; the "keypad LED" item was set as "always OFF"; the "incoming/outgoing SMS messages" item was set as "bar incoming SMS messages"; the "SMS notification method" item was set as "vibrate"; the "LCD" item was set as "LCD OFF"; and the "backlight" item was set as "backlight OFF". The controller 10 then moves to step 506 to perform power saving control according to the power saving mode items set as described above.

As apparent from the above description, the present invention provides an apparatus and method for performing power saving control of a mobile terminal, which has the following features and advantages. Via an interface with a user, the mobile terminal specifies a power saving mode type, and sets a power saving mode ON condition and power saving mode items corresponding to the specified power saving mode type. When the set power saving mode ON condition is satisfied, the terminal performs power saving control according to the set power saving mode items. The power saving mode ON condition may be determined based on a remaining battery capacity, and the power saving mode items may be set by the user in various ways. The present invention thus allows the user to actively select how the mobile terminal performs the power saving control, in their desired manners according to the remaining battery capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the present invention has been described with reference to an example where the power saving mode items include "alarm", "incoming/outgoing calls", "keypad LED", "incoming/outgoing SMS messages", "SMS notification method", "LCD", and "backlight" items. However, the power saving mode items may include any item that can be used to reduce power consumption of the mobile terminal. Accordingly, the scope of the present invention should not be limited to the above embodiments, but defined by the accompanying claims as well as equivalents thereof.

What is claimed is:

1. An apparatus for performing a power saving control of a mobile terminal, comprising:
    a battery capacity measurement unit for measuring battery capacity of a battery of the mobile terminal;
    an input unit for specifying a power saving mode type of the mobile terminal, and setting a power saving mode and power saving mode items corresponding to the specified power saving mode type;
    a memory for storing information of the set power saving mode and the set power saving mode items in association with the specified power saving mode type; and
    a controller for performing power saving control corresponding to the set power saving mode items if the battery capacity measured by the battery capacity measurement unit is less than or equal to a battery capacity set in the power saving mode.

2. The apparatus according to claim 1, wherein the power saving mode items include alarm, incoming/outgoing calls, keypad LED, incoming/outgoing SMS messages, SMS notification method, LCD and backlight items.

3. The apparatus according to claim 2, wherein the alarm item is used to set an alarm to be activated or deactivated during a power saving mode and to set a duration of the alarm if the alarm is activated.

4. The apparatus according to claim 2, wherein the incoming/outgoing calls item is used to bar at least one of incoming and outgoing wireless signals during a power saving mode.

5. The apparatus according to claim 2, wherein the keypad LED item is used to set a keypad LED to be one of constantly off and turned on only when a key is pressed during a power saving mode.

6. The apparatus according to claim 2, wherein the incoming/outgoing SMS messages item is used to bar at least one of incoming and outgoing SMS messages during a power saving mode.

7. The apparatus according to claim 2, wherein the SMS notification method item is used to set a method for notifying a user of receipt of an SMS message during a power saving mode to one of vibrating and ringing.

8. The apparatus according to claim 2, wherein the LCD item is used to set an LCD to be turned on or off during a power saving mode.

9. The apparatus according to claim 2, wherein the backlight item is used to set a backlight to be turned on or off during a power saving mode.

10. A method for performing power saving control of a mobile terminal, comprising the steps of:
    specifying a power saving mode type upon request of a user to specify the power saving mode type;
    setting a power saving mode condition corresponding to the specified power saving mode type;
    setting power saving mode items corresponding to the specified power saving mode type;
    measuring battery capacity of a battery of the mobile terminal; and
    performing power saving control corresponding to the set power saving mode items if the battery capacity measured by the battery capacity measurement unit is less than or equal to a battery set in the power saving mode.

11. The method according to claim 10, wherein the power saving mode items include alarm, incoming/outgoing calls, keypad LED, incoming/outgoing SMS messages, SMS notification method, LCD and backlight items.

12. The method according to claim 11, wherein the alarm item is used to set an alarm to be activated or deactivated during a power saving mode and to set a duration of the alarm if the alarm is activated.

13. The method according to claim 11, wherein the incoming/outgoing calls item is used to bar at least one incoming and outgoing wireless signals during a power saving mode.

14. The method according to claim 11, wherein the keypad LED item is used to set a keypad LED to be constantly off or turned on only when a key is pressed during a power saving mode.

15. The method according to claim 11, wherein the incoming/outgoing SMS messages item is used to bar at least one of incoming and outgoing SMS messages during a power saving mode.

16. The method according to claim 11, wherein the SMS notification method item is used to set a method for notifying a user of receipt of an SMS message during a power saving mode to one of vibrating and ringing.

17. The method according to claim 11, wherein the LCD item is used to set an LCD to be turned on or off during a power saving mode.

18. The method according to claim 11, wherein the backlight item is used to set a backlight to be turned on or off during a power saving mode.

* * * * *